United States Patent [19]

Joseph

[11] Patent Number: 4,730,817
[45] Date of Patent: Mar. 15, 1988

[54] HYDROPNEUMATIC SUSPENSION ELEMENT OF A HEAVY VEHICLE OR A LANDING SET OF WHEELS OF AN AIRCRAFT

[75] Inventor: Philippe Joseph, Carpentras, France

[73] Assignee: S.A.M.M. Societe d'Applications des Machines Motrices, France

[21] Appl. No.: 804,570

[22] Filed: Dec. 4, 1985

[30] Foreign Application Priority Data

Dec. 12, 1984 [FR] France .................. 84 19015

[51] Int. Cl.⁴ .................. F16F 9/14; F16F 9/42; F16F 9/06; B64C 25/58
[52] U.S. Cl. .................. 267/64.15; 188/274; 188/314; 244/104 FP
[58] Field of Search .......... 188/274, 280, 312, 313, 188/314; 267/8 R, 15 A, 64.13, 64.15, 64.16, 217, 221, 256; 280/708; 244/104 FP

[56] References Cited

U.S. PATENT DOCUMENTS

| | | | |
|---|---|---|---|
| 3,017,172 | 1/1962 | Hartel .................. | 267/64.13 |
| 3,128,088 | 4/1964 | Paschakarnis .......... | 267/64.15 X |
| 3,194,354 | 7/1965 | Smith .................. | 188/274 |
| 3,795,291 | 3/1974 | Naito et al. ........... | 188/274 |
| 4,280,600 | 7/1981 | Salmon et al. ......... | 188/312 |

FOREIGN PATENT DOCUMENTS

| | | |
|---|---|---|
| 0122731 | 10/1984 | European Pat. Off. . |
| 2195537 | 3/1974 | France . |
| 2389046 | 11/1978 | France . |
| 0158111 | 9/1982 | Japan .................. 267/64.13 |
| 1013821 | 12/1965 | United Kingdom . |

Primary Examiner—Andres Kashnikow
Assistant Examiner—Robert J. Oberleitner
Attorney, Agent, or Firm—Sughrue, Mion, Zinn, Macpeak, and Seas

[57] ABSTRACT

The element comprises a tubular body connected to the hub of a wheel and pivotally connected to the base of the chassis (5) by an arm. This body is slidably mounted on a rod (4) pivotally connected to the chassis (5) of the vehicle, the tubular body containing a gas chamber (11) and a hydraulic liquid chamber (13) divided into two compartments by a central ring (25) fixed to the rod (4). According to the invention, there is provided a device (15) for drawing the hydraulic liquid and disposed outside the tubular body (2) which is slidably mounted on the rod (4) by two fluidtight bearings (42, 55) forming the ends of the hydraulic chamber (13) and spaced apart by a constant distance. The drawing device (15) permits the dissipation to the exterior of the hydraulic chamber (13) of the heat stored by the oil during the reciprocating motions of the suspension element and thus avoids the disadjustment of the ground clearance of the vehicle.

11 Claims, 6 Drawing Figures

HYDROPNEUMATIC SUSPENSION ELEMENT OF A HEAVY VEHICLE OR A LANDING SET OF WHEELS OF AN AIRCRAFT

The present invention relates to a hydropneumatic suspension element of a heavy vehicle or of a landing set of wheels of an aircraft.

More particularly, the invention relates to a suspension element of the type comprising a tubular body connected to a wheel mounted on a rod pivotally connected to the chassis of the vehicle, the tubular body containing a gas chamber and a hydraulic liquid chamber divided into two compartments by a central ring fixed to the rod.

In suspension elements of this type, the gas chamber is usually separated from the hydraulic liquid chamber by a movable piston or by a flexible diaphragm. It has been found that, in practice, the fluidtightness thus achieved between the oil and the gas is not always satisfactory. Further, this diaphragm or this piston only provides an insufficient thermal insulation between the gas and the hydraulic liquid. Consequently, the drawing of the hydraulic liquid caused by the reciprocating motion of the tubular body on the rod when the vehicle is in motion, in particular on uneven ground ("drawing" is intended to mean the repeated to-and-fro motion of the oil caused by the constricted passages from one compartment to the other of the hydraulic chamber during the reciprocating motions), causes a heating of the oil which is transmitted to the gas through the flexible diaphragm or piston. As a result of this phenomenon, the volume of the gas increases and modifies in an undesirable manner the ground clearance of the vehicle.

An object of the invention is to overcome these drawbacks.

According to the invention, the suspension element is so arranged in that it is provided with a hydraulic liquid drawing device arranged outside the tubular body.

Thus, the to-and-fro motion of the hydraulic liquid occurs partly outside the tubular body, so that it is possible to dissipate to the exterior of the suspension element the major part of the heat stored in the liquid and thus avoid a substantial heating of the gas.

According to an embodiment of the invention, the drawing device comprises a body fixed laterally to the tubular body in which are formed two chambers communicating with each other and with two hydraulic liquid circulating conduits which are arranged in the tubular body and open out at the opposite ends of the hydraulic liquid chamber, said chambers each containing a check-means, one of which ensures the damping of the compression and the other the damping of the expansion.

Thus, the heat stored by the drawing of the oil is transmitted in major part to this device where it is dissipated in the exterior atmosphere.

According to another important feature of the invention, the gas chamber and the hydraulic liquid chamber are separated by an annular shoulder inside the tubular body constituting a bearing and by which the tubular body is in slidable bearing relation to the rod, said shoulder being provided with means ensuring fluidtightness between the gas chamber and hydraulic liquid chamber.

Such a bearing, provided with sufficient length, ensures a substantially absolute fluidtightness between the oil and the gas.

Further features and advantages of the invention will be apparent from the following description, with reference to the accompanying drawings which illustrate an embodiment by way of a non-limiting example. In the drawings.

Figure 1:
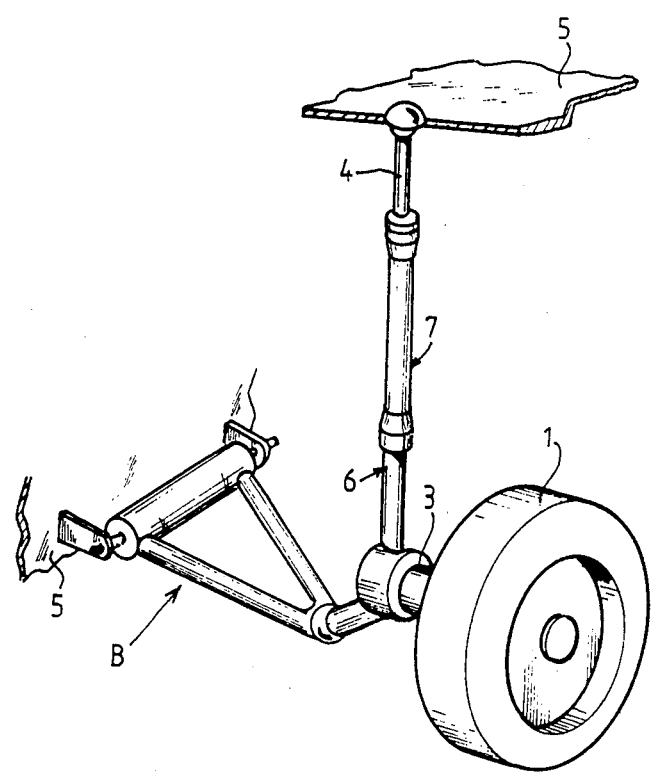
FIG. 1 is a diagrammatic perspective view of the suspension element according to the invention and its pivotal connections to the chassis of the vehicle.

The hydropneumatic suspension element shown in the drawings is adapted to be provided for a wheel 1 of a heavy vehicle or of a landing set of wheels of an aircraft, there being associated with each wheel 1 such an element whose longitudinal axis X—X is normally vertical.

This element comprises a tubular body 2 connected to the axle 3 of the wheel 1, slidably mounted on a rod 4 pivotally connected to the chassis 5 of the vehicle in the known manner. Further, the body 2 is pivotally connected to a suspension arm B (FIG. 1) connected to the chassis 5 of the vehicle in the known manner.

This tubular body 2 is formed by two parts which are coaxial with each other and with the arm 4, and therefore have a common axis X—X. A first tubular part 8 whose lower end is fixed to the axle 3, and a second tubular part 7 provided at its lower end with a cylindrical enlarged portion 9 in which is fitted the end 8 of the first part 6, the end 8 being fixed to the enlarged portion 9 by any suitable means, such as a screwed assembly. The lower part 6 of the tubular body 2 contains a compressed gas chamber 11, for example nitrogen, which may be introduced through an end cap 12 in the known manner, while the second tubular part 7 defines a chamber 13 for the hydraulic liquid which is preferably oil. The chamber 13 is defined by the inner wall of the tubular part 7 and by the periphery of the rod 4 and is therefore annular, the oil being for example introduced into the chamber 13 through a supply pipe 14.

According to the invention, the suspension element is provided with a drawing device 15 for the hydraulic liquid (which will be assumed to be oil in the following description), arranged outside the tubular body 2.

Figure 1A:
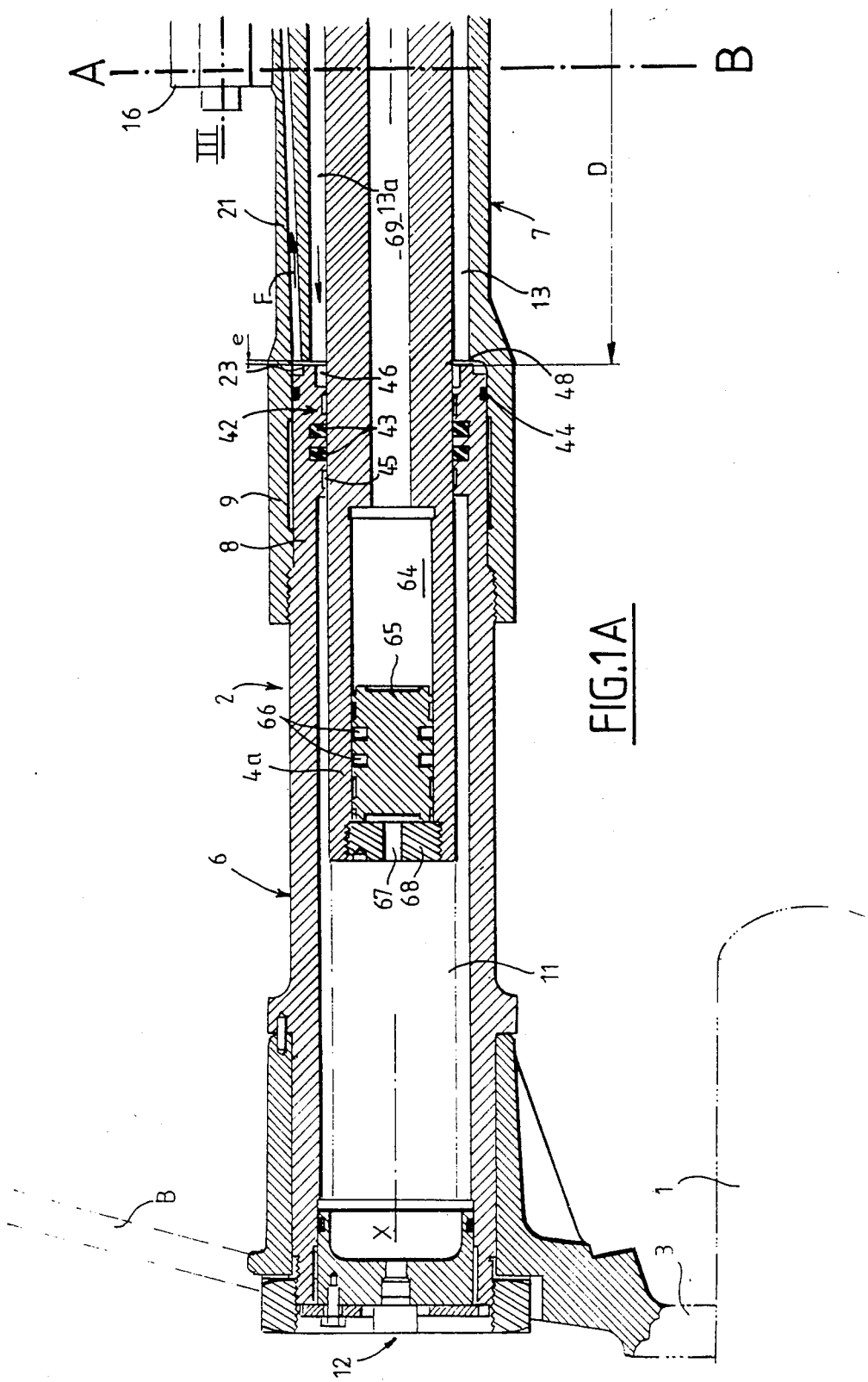
FIGS. 1A and 1B are two complementary half-views in longitudinal axial section of an embodiment of the hydropneumatic element for a heavy vehicle according to the invention, these half-views being connected along the line A–B.
Figure 1B:
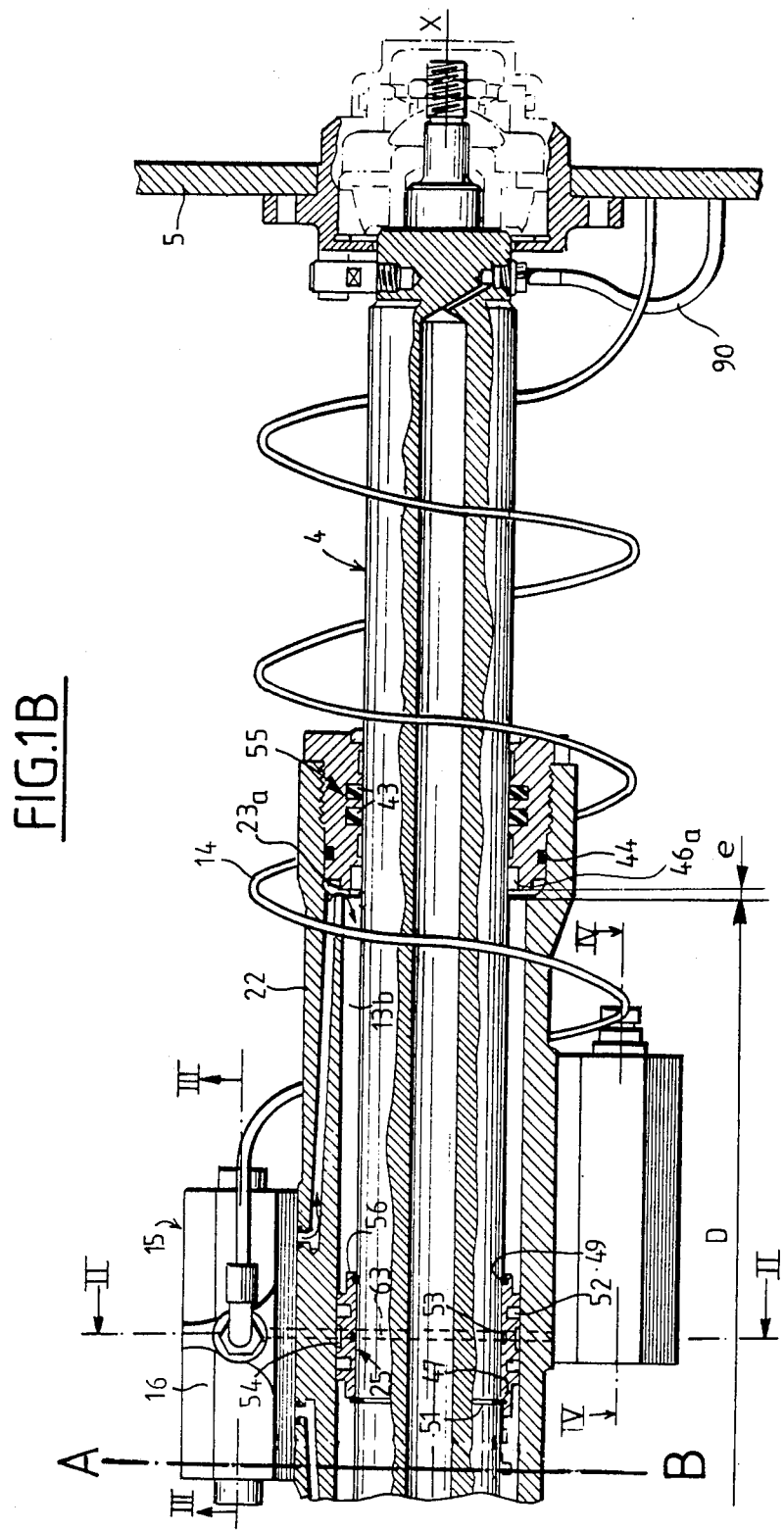
Figure 2:
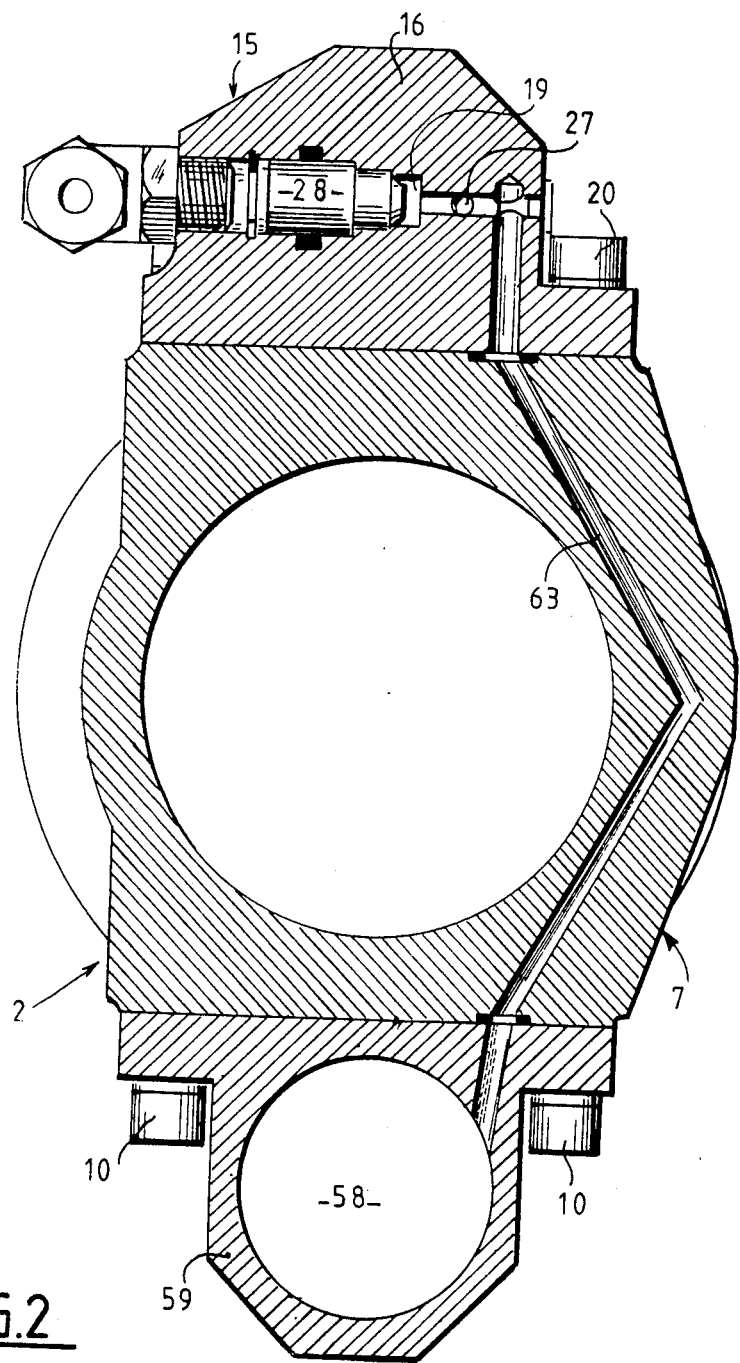
FIG. 2 is a cross-sectional view taken on line II—II of FIG. 1.

The drawing device 15 comprises a body 16, fixed laterally by screws 20 to the tubular part 7 of the body 2, and formed in this body 16 are two chambers 17, 18 which communicate with each other through a central passage 19 and with two oil circulating conduits 21, 22 arranged in the part 7 of the body 2. The conduits 21, 22 open onto opposed annular abutments 23, 23a of the chamber 13, from which they are separated by gaps e (FIG. 1A and 1B). The chamber 13 is divided into two compartments 13a, 13b, by a central ring 25 fixed to the rod 4, and on which the tubular part 7 is slidable in a fluidtight manner.

The oil drawing conduits 21, 22 therefore communicate with the chambers 17 and 18 of the drawing device 15 through passages in the body 16 (not shown in the plane of FIG. 3), these chambers being connected to the central passage 19 through bores 26, 27. The central passage 19 can be closed by a valve 28 slidably mounted in a transverse bore 29 with which communicate two pipes 31, 32 which communicate with the pipe 14. The latter constitutes with the valve 28 a circuit whereby it is possible to stop any circulation of oil in the chamber 13 when the valve 28 is made to close the passage 19 in the known manner, the suspension element being thus blocked in a predetermined position.

Each chamber 17, 18 of the drawing device 15 is provided with a check-means, namely, in the presently-described embodiment, a respective ball 33, 34 biased by a spring 35, 36 against a seat formed in a member 37,38 fixed in the chamber 17, 18 and provided with a passage 39, 41. The latter communicates with a compartment 17a, 18a which communicates with the opening 26, 27 and the central passage 19.

Figure 3:
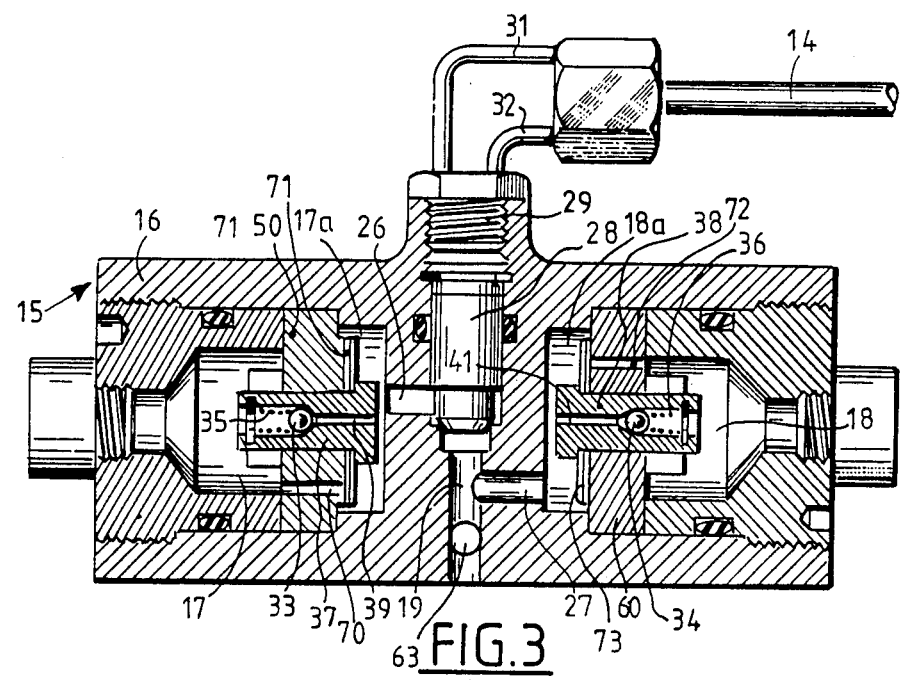
FIG. 3 is a longitudinal sectional view of the drawing device with which the element according to the invention is provided, taken on line III—III of FIG. 1.
Figure 4:
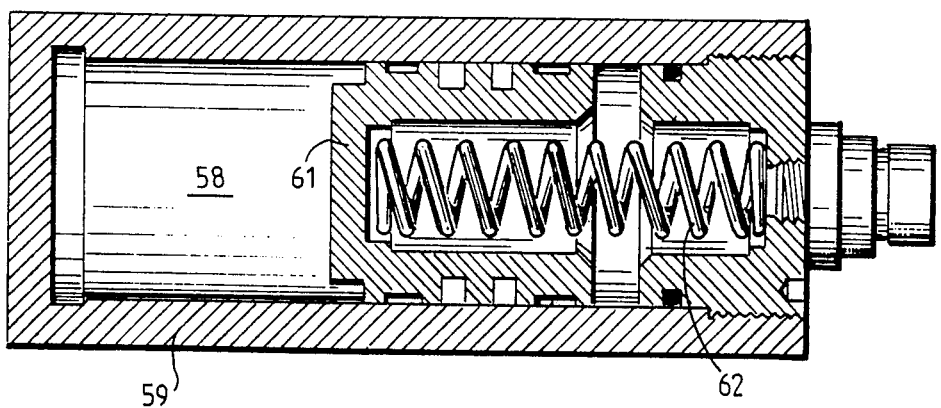
FIG. 4 is a longitudinal sectional view of a hydraulic liquid expansion device taken on line IV—IV of FIG. 1B, this device being fixed laterally to the tubular body.

The members 37, 38 extend through supports 50, 60 fixed in the body 16 and defining respectively, on one hand, the chamber 17 and the chamber 17a and, on the other hand, the chamber 18 and the compartment 18a. Extending respectively through the supports 50, 60 are a plurality of ports 70, 72 (of which only one for each support is shown in FIG. 3), which put the chambers 17, 18 and the compartments 17a, 18a in communication with each other. The ports 70 of the support 50 are normally closed by the corresponding deformable valve members 71 connected to the support 50 and disposed around the member 37, these valve members 71 being capable of lifting, when the oil pressure in the ports 70 is sufficient. Likewise, deformable valve members 73 similar to the valve members 71 are fixed to the side of the support 60 defining the compartment 18a, and normally closing the ports 72. These valve members 73 are capable of being lifted and allowing the passage of the oil of the ports 72 into the compartment 18a, when the oil pressure in the ports 72 is sufficient.

Thus, as the conduits 21 and 22 respectively communicate with the chambers 17a, 18, a circulation of oil in the conduit 21 toward the drawing device 15 (in the direction of arrow F in FIG. 1A) passes through the chamber 17, the ports 70, lifts the deformable valves 71, passes through the compartment 17a, the opening 26, the passage 19, the opening 27 and the compartment 18a, shifts the ball 34 away from its seat, passes into the chamber 18 and thence into the conduit 22, then into the compartment 13b of the hydraulic chamber 13. Inversely, the oil expelled through the conduit 22, enters the compartment 18a, passes through the ports 72, lifts the deformable valve members 73, passes through the compartment 18a, the opening 27, the passage 19, the opening 26 and the compartment 17a, then shifts the ball 33 away from its seat and passes through the chamber 17 and flows into the compartment 13a through the conduit 21.

The chamber 17 and the valve 33, 35 ensure the damping of the compression of the oil, while the chamber 18 and the check-valve 34, 36 ensure the damping of the expansion during the successive reciprocating motions of the suspension element.

According to a feature of the invention, the chamber 11 for the compressed gas and the oil chamber 13 are separated by an annular bearing 42 of the tubular body 2 through which bearing the body 2 slidably bears against the rod 4, this shoulder or bearing 42 being provided with means for ensuring fluidtightness between the chambers 11 and 13. In the presently-described embodiment, the bearing 42 constitutes the end of the tubular part 6 fitted in the end portion 9 of the tubular part 7 and the means for ensuring fluidtightness between the chambers 11 and 13 comprise two internal dynamic sealing elements 43 disposed in grooves in the bearing 42 and in fluidtight sliding contact with the surface of the rod 4. An external static sealing element 44 disposed in a corresponding groove facing outwardly provides the seal between the chamber 13 and the inner wall of the end portion 9. Two bearing rings 45 are disposed in the bearing 42 on each side of the dynamic sealing elements 43, and in sliding contact with the rod 4, and an annular cavity 46 is provided at the end of the bearing 42 adjacent to the chamber 13.

This cavity 46 constitutes an upper abutment capable of receiving at the end of travel a corresponding shoulder 47 formed on the ring 25. Further, this annular gap ensures a damping of the end of traval of the tubular body 2 on the rod 4, by a drawing of the oil when the shoulder 47 is engaged in the cavity 46.

The ring 25 is fixed to the rod 4 by a ring 49 adjacent to the compartment 13b, and by a circlip 51 adjacent to the compartment 13a. Two dynamic sealing elements 52 mounted in the ring 25 provide the seal between the latter and the tubular part 7 and a static sealing element 53 guarantees the seal between the rod 4 and the ring 25, a bearing ring 54 being disposed between the sealing elements 52.

The end of the tubular part 7 which is the nearest to the pivotal connection of the rod 4 to the chassis 5 is provided with a bearing 55 similar to the bearing 42, and fixed by any suitable means, such as a screw assembly or welding, to the end part of the body 7 and slidably bearing against the rod 4 in a sealed manner. The two sealed bearings 42, 55 are therefore connected to the tubular part 7 of the body 2 and are thus separated by a constant gap D, irrespective of the respective positions of the rod 4 and tubular body 2.

The bearing 55 has in particular at its end defining the compartment 13b of the chamber 13, a cavity 46 identical to the cavity 46 of the bearing 42, and constituting a lower abutment capable of receiving a corresponding shoulder 56 of the ring 25 at the end of the travel of the body 2. In entering the cavity 46a, the shoulder 56 draws the oil which is contained in this cavity and expelled upon entry of the shoulder 56, and this has for effect to energetically brake the body 2 which consequently assumes its position of abutment at zero velocity, this arrangement being similar to that of the abutment 23 and the cavity 46.

The drawing device 15 is connected to an expansion chamber 58 formed in a cylindrical body 59 fixed outside the tubular part 7 by screws 10 and permitting the expansion of the oil in the event of a large amount of heating. For this purpose, the chamber 58 contains a slidable piston 61, fixed to one end of a coaxial inner spring 62 whose other end is connected to the end of the cylinder 59. The chamber 58 communicates with the central passage 19 of the drawing device 15 through a transverse conduit 63 extending around the tubular part 7. In the event of a great amount of heating of the oil, the latter expands in the chamber 58 and urges back the piston 61 in opposition to the opposing action of the return spring 62.

According to the invention, there is also provided a chamber 64 in the end portion 4a of the rod 4 disposed in the gas chamber 11. This chamber 64 has an axis X—X and contains a piston 65 which is slidable therein in a fluidtight manner owing to the provision of dynamic sealing elements 66, and communicates, on one side of the piston 65, with the gas chamber 11 through a bore 67 formed in an end wall 68 fixed to the end 4a, and, on the other side of the piston 65, with a pipe 69 having the axis X—X and supplying the chamber 64 with hydraulic liquid controlling the piston 65. At the opposite end of the rod 4, the pipe 69 communicates with a pipe 90 of an oil circuit (not shown).

The position of the piston 65, determined by the amount of oil in the pipe 69 and the chamber 64, enables the pressure of the gas in the chamber 11 to be regulated and consequently the ground clearance of the vehicle or of the landing set of wheels to be adjusted.

During the reciprocating motions of the suspension element just described, when the vehicle travels along a more or less even ground, the tubular body 2 slides on the rod 4, the upper and lower limits of these reciprocating motions being determined respectively by the engagement of the shoulder 47 in the corresponding cavity 46 and the engagement of the projecting shoulder 56 in the cavity 46a of the bearing 55. During these reciprocating motions, the oil of the compartments 13a, 13b is alternately expelled in the drawing device 15 through the exterior of the cavity 46, the conduit 21, the chamber 17, the compartment 17a, the central passage and the chamber 18 with the opening of the check-valve 34, 36 during the compression travel, and inversely, during the expansion travel, through the exterior of the cavity 46a of the bearing 55, the conduit 22, the chamber 18, the ports 72, the compartment 18a, the central passage 19, the chamber 17, with the opening of the valve 33, 35 with, finally, the return to the compartment 13a through the conduit 21. At the end of the travel, the gaps e ensure the damping action against the abutments 23, 23a and the oil heated by this drawing dissipates the major part of its heat during its passage through the drawing device 15. Thus, the heat stored by the oil is not transmitted to the gaps of the chamber 11 and the ground clearance of the vehicle is not altered in an undesired manner.

Further, as already mentioned, the separation of the chambers 11 and 13 by the bearing 42 ensures a practically absolute seal between the oil and the gas and therefore an improved thermal insulation between these two fluids.

The fact of providing two bearings 42, 55 with a constant distance therebetween, is an important advantage since this constant distance ensures a constant resistance of the suspension element to torsion produced by the movements of the wheel 1. Indeed, such a constant resistance to torsion would not be obtained if the second bearing were fixed to a movable piston as is the case in certain known arrangements. The suspension element therefore has an improved mechanical strength.

The arrangement of the slidable piston 65 in the chamber 64 of the rod 4 enables the pressure of the gas in the chamber 11, and therefore the ground clearance of the vehicle, to be varied.

It must be understood that the scope of the invention is not intended to be limited to the described embodiment and may encompass many modifications. The drawing device 15 in particular may be replaced by any other device equivalent to that shown in the drawings and ensuring the cooling of the oil outside the body 2, and the bearings 42, 55 may if desired be provided with only a single dynamic sealing element 43.

What is claimed is:

1. A hydropneumatic suspension element for a heavy, and in particular armoured, vehicle or a landing set of wheels of a vehicle such as an aircraft, said element comprising a tubular body for connection to a hub of a wheel and for pivotal connection to an arm pivotally connected to the bottom of a chassis of a vehicle, a rod for pivotal connection to the chassis of the vehicle and slidably mounted in said tubular body, said tubular body containing a gas chamber and a hydraulic liquid chamber, a central ring fixed to said rod and dividing said liquid chamber into two compartments, and a device disposed outside said tubular body for drawing the hydraulic liquid; wherein said drawing device comprises a second body fixed laterally on said tubular body, said second body containing a first chamber and a second chamber communicating with each other, two hydraulic liquid circulation conduits arranged in said tubular body, opening onto opposed ends of said hydraulic liquid chamber and communicating with said first and second chambers, said first and second chambers each containing check-means, one of which check-means is adapted to assure the damping of the compression while the other of said check-means is adapted to assure the damping of the expansion.

2. A suspension element according to claim 1, comprsing means defining a passage interconnecting said first and second chambers, a closing valve member inserted in said passage for closing said passage, a circuit for blocking the suspension being combined with said closing valve member for controlling it.

3. A suspension element according to claim 1, comprising an annular shoulder constituting a bearing inside said tubular body and separating said gas chamber from said hydraulic liquid chamber, said tubular body being in abutting relation against said shoulder in its sliding movement on said rod, said shoulder including means for providing fluidtightness between said gas chamber and said hydraulic liquid chamber.

4. A suspension element according to claim 3, comprising a first tubular part mounted on a second tubular part, which second tubular part constitutes with said first tubular part said tubular body, said shoulder constituting an end of said first tubular part and said means providing fluidtightness comprising at least one internal dynamic sealing element in sliding contact with said rod, and at least one external static sealing element providing fluidtightness between said two tubular parts of said tubular body.

5. A suspension element according to claim 3, wherein an end of said tubular body which is the closest to said pivotal connection of said rod to the chassis is provided with a second bearing in sliding fluidtight contact with said rod, said shoulder forming a bearing and said second bearing being connected to said tubular body and thus separated by a gap which is constant irrespective of the respective positions of said rod and said tubular body.

6. A suspension element according to claim 4, wherein an end of said tubular body which is the closest to said pivotal connection of said rod to the chassis is provided with a second bearing in sliding fluidtight contact with said rod, said shoulder forming a bearing and said second bearing being connected to said tubular body and thus separated by a gap which is constant irrespective of the respective positions of said rod and said tubular body.

7. A suspension element according to claim 5, wherein said two bearings of said tubular body are provided with respectively upper and lower abutments and damping means for the end of the travel of said tubular body and adapted to receive conjugate shoulders formed on opposite ends of said central ring fixed to said rod.

8. A suspension element according to claim 6, wherein said two bearings of said tubular body are provided with respectively upper and lower abutments and damping means for the end of the travel of said tubular body and adapted to receive conjugate shoulders formed on opposite ends of said central ring fixed to said rod.

9. A suspension element according to claim 1, comprising a chamber, containing a piston slidably mounted therein in a fluidtight manner, and provided in said rod and communicating, at one end of said piston, with said gas chamber and, at an opposite end of said piston, with a hydraulic liquid supply pipe adapted to control said piston and provided axially in said rod, the position of said piston enabling the pressure of the gas, and consequently the ground clearance of said vehicle, to be adjusted.

10. A suspension element according to claim 1, comprising an expansion chamber of the hydraulic liquid fixed to said tubular body and communicating with said drawing device and containing a piston biased by elastically yieldable means so as to allow expansion of the liquid in the event of great heating.

11. A hydropneumatic suspension element for a heavy, and in particular armoured, vehicle or a landing set of wheels of a vehicle such as an aircraft, said element comprising a tubular body for connection to a hub of a wheel and for pivotal connection to an arm pivotally connected to the bottom of a chassis of the vehicle, a rod for pivotal connection to the chassis of the vehicle and slidably mounted in said tubular body, said tubular body containing a gas chamber and a hydraulic liquid chamber, a central ring fixed to said rod and dividing said liquid chamber into two compartments, and a device disposed outside said tubular body for drawing the hydraulic liquid; and further comprising an expansion chamber of the hydraulic liquid fixed to said tubular body and communicating with said drawing device and containing a piston biased by elastically yieldable means so as to allow expansion of the liquid in the event of great heating.

* * * * *